US012611908B2

(12) United States Patent
Jeon et al.

(10) Patent No.: US 12,611,908 B2
(45) Date of Patent: Apr. 28, 2026

(54) VEHICLE AIR CONDITIONING APPARATUS

(71) Applicant: Hanon Systems, Daejeon (KR)

(72) Inventors: Ki Man Jeon, Daejeon (KR); Jae Woo Ko, Daejeon (KR); Ki Jung Park, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 184 days.

(21) Appl. No.: 18/567,057

(22) PCT Filed: Dec. 21, 2022

(86) PCT No.: PCT/KR2022/020982
§ 371 (c)(1),
(2) Date: Dec. 5, 2023

(87) PCT Pub. No.: WO2023/128457
PCT Pub. Date: Jul. 6, 2023

(65) Prior Publication Data
US 2024/0262156 A1    Aug. 8, 2024

(30) Foreign Application Priority Data

Dec. 29, 2021    (KR) ........................ 10-2021-0190726

(51) Int. Cl.
*B60H 1/00* (2006.01)
(52) U.S. Cl.
CPC ..... *B60H 1/00064* (2013.01); *B60H 1/00678* (2013.01); *B60H 2001/00092* (2013.01); *B60H 2001/00135* (2013.01)
(58) Field of Classification Search
CPC .............. B60H 1/0005; B60H 1/00064; B60H 1/00035; B60H 1/00678; B60H 2001/00092
See application file for complete search history.

(56) References Cited

U.S. PATENT DOCUMENTS

| | | | | |
|---|---|---|---|---|
| 7,228,895 B2 * | 6/2007 | Natsume | ............ | B60H 1/00064 |
| | | | | 165/204 |
| 2021/0053414 A1 | 2/2021 | Lee | | |
| 2023/0234420 A1 * | 7/2023 | Pierres | ............... | B60H 1/00028 |

FOREIGN PATENT DOCUMENTS

| | | |
|---|---|---|
| JP | 2005-138735 A | 6/2005 |
| JP | 2015080959 | 4/2015 |

(Continued)

OTHER PUBLICATIONS

International Search Report issued in PCT/KR2022/020982 on Mar. 28, 2023.

(Continued)

*Primary Examiner* — Allen R. B. Schult
(74) *Attorney, Agent, or Firm* — NORTON ROSE FULBRIGHT US LLP

(57)        ABSTRACT

Vehicle air conditioning apparatus comprising air conditioning case with inlet and outlet, partition wall dividing the inner space into a first and a second space portions; cooling heat exchanger disposed inside the air conditioning case to span the first and second space portions and connected to the outlet; and heat exchanger disposed inside the air conditioning case to span the first and second space portions. The air conditioning case includes a first flow path disposed in the second space portion below the heat exchanger; a channel part disposed behind the heat exchanger, with its entrance communicating with the first flow path, and exit communicating with the first space portion. Accordingly, a portion of air flowing to the first flow path via cooling heat exchanger without passing through heat exchanger is guided to the first space portion via the channel part without being mixed with air passing through heating heat exchanger.

16 Claims, 11 Drawing Sheets

(56)     References Cited

FOREIGN PATENT DOCUMENTS

| JP | 2018131150 | 8/2018 |
| KR | 1020050111251 | 11/2005 |
| KR | 10-0759425  B1 | 9/2007 |
| KR | 10-1313583  B1 | 10/2013 |
| KR | 10-1602173  B1 | 3/2016 |

OTHER PUBLICATIONS

English translation of Official Action issued Apr. 19, 2025 in related Korean Patent Application No. KR 10-2021-0190726, 11 pgs.

* cited by examiner

VEHICLE AIR CONDITIONING APPARATUS

CROSS REFERENCE TO RELATED APPLICATIONS

This patent application is a national phase under 35 U.S.C. § 371 of International Patent Application No. PCT/KR2022/020982 filed Dec. 21, 2022, which claims the benefit of priority from Korean Patent Application Nos. 10-2021-0190726 filed Dec. 29, 2021, each of which is hereby incorporated herein by reference in its entirety for all purposes.

TECHNICAL FIELD

Embodiments relate to an air-conditioning apparatus for a vehicle.

BACKGROUND ART

An air-conditioning apparatus for a vehicle discharges cooled or heated air to a vehicle interior. The air-conditioning apparatus for a vehicle may supply air to the vehicle interior according to a plurality of air-conditioning modes (e.g., a vent mode, a bi-mode, a floor mode, a mix mode, and a defrost mode).

When the vehicle interior is heated, cold outside air is introduced to prevent frost on a window glass. However, when the cold outside air is supplied to the interior, there is a problem in that the interior air temperature of the vehicle is decreased. Therefore, there is an air-conditioning apparatus capable of dual-flow supply in which outside air is supplied to the window glass of the vehicle and indoor air is supplied to the vehicle interior.

The air-conditioning apparatus for the dual-flow supply is divided into an upper space and a lower space by partitioning the inside of a case, in the upper space, air is supplied to a vehicle window and the like through an outlet positioned in the upper space, and in the lower space, air is supplied to an interior floor of the vehicle through an outlet disposed in the lower space.

At this time, in the bi-mode, that is, in the mode in which warm air passing through the heating heat exchanger is discharged from the upper space and air passing through the heating heat exchanger is also discharged from the lower space, there is a problem in that a difference between a temperature of the air discharged from the upper space and a temperature of the air discharged from the lower space becomes great, and thus a passenger feels hot on his or her face, but the passenger feels cold on his or her feet. In the lower space, since air is discharged after being mixed with the air passing under the heating heat exchanger without the air passing through the heating heat exchanger, in the dual-flow supply, a temperature of the air discharged from the lower space is relatively very lower.

Technical Problem

The present invention is directed to providing an air-conditioning apparatus for a vehicle capable of reducing a difference of a temperature of air discharged from an upper space and a temperature of air discharged from a lower space in dual-flow supply.

The object of the present invention is not limited to the above-described object, and other objects that are not mentioned will be able to be clearly understood by those skilled in the art from the following description.

Technical Solution

An embodiment provides an air-conditioning apparatus for a vehicle including an air-conditioning case including an inlet, an outlet, and a partition wall configured to partition an inner space into a first space portion and a second space portion, a cooling heat exchanger disposed inside the air-conditioning case and connected to the inlet to be disposed to cross the first space portion and the second space portion, and a heating heat exchanger disposed inside the air-conditioning case to be disposed to cross the first space portion and the second space portion, wherein the air-conditioning case includes a first flow path disposed in the second space portion and a channel part, the first flow path is disposed under the heating heat exchanger, and the channel part is disposed behind the heating heat exchanger, and an inlet of the channel part communicates with the first flow path and an outlet of the channel part communicates with the first space portion to guide a portion of air passing through the cooling heat exchanger and flowing through the first flow path without passing through the heating heat exchanger to the first space portion through the channel part without being mixed with air passing through the heating heat exchanger.

The outlet may include a first outlet communicating with the first space portion and a second outlet communicating with the second space portion, the air-conditioning case may include a first door configured to selectively open or close the second outlet, and the first door opens and closes the outlet of the channel part and the first outlet together.

The first door may include a shaft part rotatably coupled to the air-conditioning case, a first door plate disposed at one side of the shaft part, and a second door plate disposed at the other side of the shaft part, the first door plate may selectively open and close the first outlet, and the second door plate may selectively open and close the outlet of the channel part.

The first door plate and the second door plate may be disposed to form an obtuse angle around the shaft part.

The second door plate may include a groove, and the groove may be formed to be greater than the channel part so as to accommodate an end portion of the channel part in the groove when the second door plate covers the outlet of the channel part.

The second door plate except for a groove may be disposed to be lower than the outlet of the channel part when the first door covers the outlet of the channel part.

In a first mode in which the first outlet is open, the second door plate may close the outlet of the channel part.

The air-conditioning apparatus may further include a second door configured to open and close the second outlet, wherein, in a second mode in which the second door opens the second outlet and the first door plate opens the first outlet, the second door plate may open the first outlet and supply some air flowing through the first flow path to the first space portion.

The air-conditioning case may include a third space portion and a fourth space portion formed by partitioning the inner space into left and right sides, and the channel part may be disposed in each of the third space portion and the fourth space portion.

The air-conditioning apparatus may further include an air guide continuing to the second outlet, wherein a width of the channel part in a left-right direction may be disposed to correspond to a width of the air guide in the left-right direction.

The air-conditioning apparatus may further include an air guide continuing to the second outlet, wherein positions of the air guide and the channel part may be disposed by being aligned in a left-right direction.

The channel part may be disposed in the middle of the third space portion or the middle of the fourth space portion with respect to a left-right direction.

A width of the second door plate in a left-right direction may be greater than a width of the first door plate in the left-right direction.

The first door plate may include a 1-1 door plate and a 1-2 door plate, which are disposed to be spaced apart from each other in the left-right direction.

The outlet of the channel part may be positioned in the first space portion, and the inlet of the channel part may be positioned in the second space portion.

In the partition wall, a part of the partition wall disposed behind the heating heat exchanger may include a hole configured to allow the first space portion to communicate with the second space portion, and a size of the second door plate may be greater than a size of the hole.

An embodiment provides an air-conditioning apparatus including an air-conditioning case including an inlet, an outlet, and a partition wall configured to partition an inner space into a first space portion and a second space portion, a cooling heat exchanger disposed inside the air-conditioning case and connected to the inlet to be disposed to cross the first space portion and the second space portion, and a heating heat exchanger disposed inside the air-conditioning case to be disposed to cross the first space portion and the second space portion, wherein the air-conditioning case includes a first flow path disposed in the second space portion and a channel part, the first flow path is disposed under the heating heat exchanger, the channel part is disposed behind the heating heat exchanger, an inlet of the channel part communicates with the first flow path, an outlet of the channel part communicates with the first space portion, the outlet includes a first outlet disposed in the first space portion and a second outlet disposed in the second space portion, the air-conditioning case further includes a first door configured to open and close the second outlet, some of the partition walls disposed behind the heating heat exchanger include a hole configured to allow the first space portion to communicate with the second space portion, and the first door opens and closes the hole and the outlet of the channel part together.

Advantageous Effects

According to embodiments, there is an advantage in that it is possible to reduce a difference between a temperature of air discharged from an upper space and a temperature of air discharged from a lower space by supplying cold air from the lower space to the upper space through a channel part.

According to the embodiments, by including a groove in a first door and forming an outlet of the channel part to cover the groove, there is an advantage in that it is possible to prevent the cold air from leaking to the upper space when the first door blocks the outlet of the channel part.

According to the embodiments, by aligning positions of an air guide and the channel part disposed in the upper space in a left-right direction, there is an advantage in that it is possible to smoothly discharge the cold air in the lower space.

According to the embodiments, by correspondingly forming widths of the air guide and the channel part disposed in the upper space in the left-right direction, there is an advantage in that it is possible to smoothly discharge the cold air in the lower space.

MODES OF THE INVENTION

Hereinafter, exemplary embodiments of the present invention will be described in detail with reference to the accompanying drawings. The objects, specific advantages, and novel features of the present invention will become more apparent from the following detailed description and exemplary embodiments taken in conjunction with the accompanying drawings. In addition, in describing the present invention, detailed descriptions of related known technologies that may unnecessarily obscure the gist of the present invention are omitted.

Terms including ordinal numbers such as first and second may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

Figure 1:
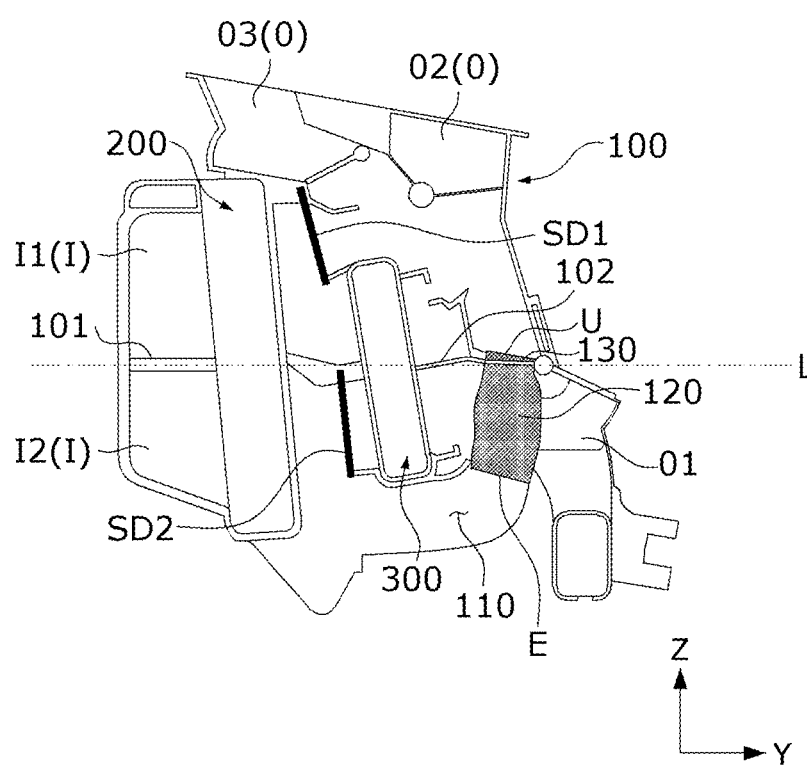
FIG. 1 is a view illustrating an air-conditioning apparatus for a vehicle according to an embodiment.

FIG. 1 is a view illustrating an air-conditioning apparatus for a vehicle according to an embodiment. Hereinafter, in the drawings, an X-axis direction represents a left-right direction of an air-conditioning apparatus for a vehicle, a Y-axis direction represents a front-rear direction of the air-conditioning apparatus, and a Z axis represents a vertical direction of the air-conditioning apparatus for a vehicle. Hereinafter, terms "front" and "rear" are based on the front-rear direction, and terms "above" and "under" are based on the vertical direction.

Referring to FIG. 1, the air-conditioning apparatus for a vehicle according to the embodiment includes an air-conditioning case 100. The air-conditioning case 100 includes an inlet I and an outlet O. The inlet I and the outlet O may be provided as a plurality of inlets and outlets. Air flowing into the inlet I is discharged through the outlet O with adjusting an amount or a discharge direction of the air. The air flowing into the inlet I may be provided from the outside of the vehicle or provided from the inside of the vehicle, or may be air in which these are mixed.

A cooling heat exchanger 200 and a heating heat exchanger 300 may be disposed inside the air-conditioning case 100. The cooling heat exchanger 200 is connected to the inlet I. Air passing through the cooling heat exchanger 200 is cooled, and air passing through the heating heat exchanger 300 is heated. The heating heat exchanger 300 may be disposed behind the cooling heat exchanger 200.

The air-conditioning case 100 may include partition walls 101 and 102 for partitioning an inner space into a first space portion A1 and a second space portion A2. The first space portion A1 may be disposed above the partition walls 101 and 102 to form an upper space of the air-conditioning case, and the second space portion A2 may be disposed under the partition walls 101 and 102 to form a lower space of the air-conditioning case. The partition walls 101 and 102 include the first partition wall 101 disposed in front of the cooling heat exchanger and the second partition wall 102 disposed behind the cooling heat exchanger 200 and extending to the rear of the heating heat exchanger 300.

The cooling heat exchanger 200 and the heating heat exchanger 300 may be disposed to cross the partition walls 101 and 102.

The inlet I is divided into a first inlet I1 and a second inlet 12 by the partition walls 101 and 102. The first inlet I1 is disposed in the first space portion A1, and the second inlet 12 is disposed in the second space portion A2. A blower (not illustrated) for blowing inside air or outside air toward the air-conditioning case 100 may be provided at the inlet I side.

The outlet O may include a first outlet O1, a second outlet O2, and a third outlet O3. The first outlet O1 may be a floor outlet disposed in the second space portion A2. The second outlet O2 may be a vent outlet disposed in the first space portion A1, and the third outlet O3 may be a defrost outlet disposed in the first space portion A1.

The air-conditioning case 100 may include a first door 130, a second door 140, a third door 150, a fourth door SD1, and a fifth door SD2. The first door 130, the second door 140, the third door 150, the fourth door SD1, and the fifth door SD2 may each be operated by an actuator including a motor.

The first door 130 is disposed in the second space portion A2 and disposed to open and close the first outlet O1.

The second door 140 is disposed in the first space portion A1 and disposed to open and close the second outlet O2.

The third door 150 is disposed in the first space portion A1 and disposed to open and close the third outlet O3.

The fourth door SD1 functions to open and close a front of the heating heat exchanger 300 or open and close the upper space of the heating heat exchanger 300 in the first space portion A1. The fifth door SD2 is formed in a slide type and may adjust the opening amount of the heating heat exchanger 300 and the opening amount of the upper space of the heating heat exchanger 300.

The fifth door SD2 functions to open and close the front of the heating heat exchanger 300 or open and close a first flow path 110, which is the lower space of the heating heat exchanger 300 in the second space portion A2. The fifth door SD2 is formed in a slide type and may adjust the opening amount of the heating heat exchanger 300 and the opening amount of the first flow path 110.

The air-conditioning case 100 includes the first flow path 110. The first flow path 110 is disposed behind the cooling heat exchanger 200 and disposed under the heating heat exchanger 300. Air passing through the cooling heat exchanger 200 may move to the first outlet O1 through the first flow path 110 without passing through the heating heat exchanger 300.

The air-conditioning case 100 includes a channel part 120. The channel part 120 is intended to guide cold air passing through the first flow path 110 to the first space portion A1. The channel part 120 allows the first flow path 110 and the second space portion A2 to communicate with each other. The channel part 120 is connected to the first flow path 110 and disposed behind the heating heat exchanger 300.

The channel part 120 has a shape surrounded by an outer wall that forms a space through which air may flow therein. An inlet E of the channel part 120 is disposed in the first space portion A1, and an outlet U of the channel part 120 is disposed in the second space portion A2. The channel part 120 may be disposed to pass through the second partition 102 and disposed so that the outlet U of the channel part 120 is positioned in the first space portion A1.

The inlet E of the channel part 120 may be disposed under a horizontal reference line L based on the first partition 101.

Figure 2:
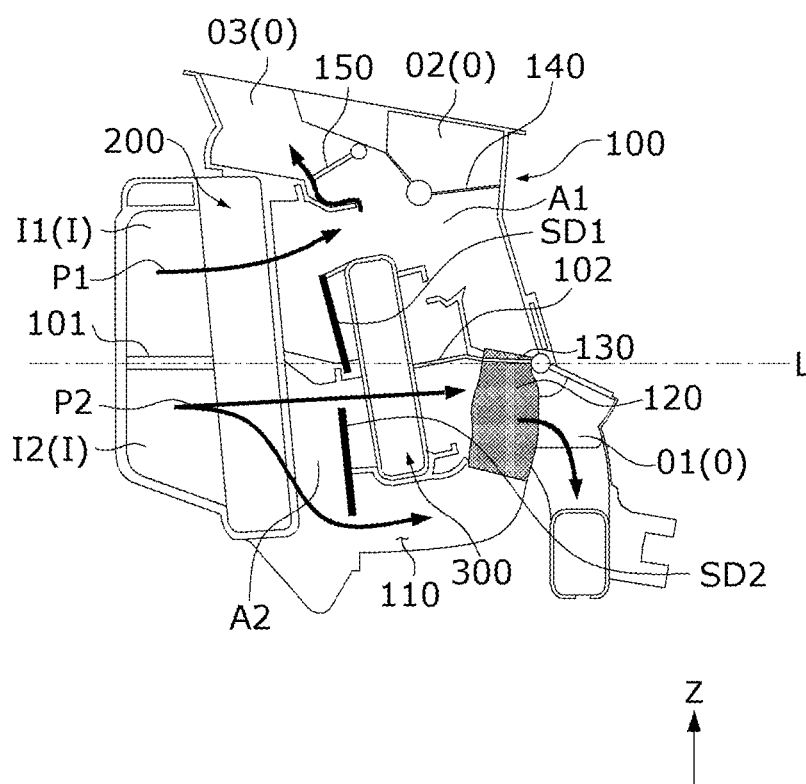
FIG. 2 is a view illustrating a path of air in a first mode which is a floor mode.

FIG. 2 is a view illustrating a path of air in a first mode which is a floor mode.

Referring to FIG. 2, in the first mode, which is the floor mode, the air moves along a first path P1 in the first space portion A1, and the air moves along a second path P2 in the second space portion A2. The first path P1 represents a direction from the first inlet I1 to the second outlet O2 or the third outlet O3, and the second path P2 represents a direction from the second inlet 12 to the first outlet O1.

In the first mode, cold outside air may be supplied along the first path P1, and inside air with a relatively higher temperature may be supplied along the second path P2.

In the first space portion A1, in the first mode, the second door 140 is in a state of closing the second outlet O2 at a vent side, and the third door 150 is in a state of slightly opening the third outlet O3. A position of the fifth door SD2 may be adjusted depending on a set temperature so that the opening amount of the heating heat exchanger 300 may be adjusted. The air moving along the first path P1 may be supplied to a window glass side.

In the second space portion A2, in the first mode, the first door 130 blocks the outlet U of the channel part 120 while fully opening the first outlet. The position of the fifth door SD2 may be adjusted depending on the set temperature so that the opening amount of the heating heat exchanger 300 may be adjusted. The air moving along the second path P2 may be supplied to a floor of the vehicle.

At this time, since the outlet U of the channel part 120 and a hole H (see FIG. 9) of the second partition 102 are blocked by the first door 130, the first space portion A1 and the second space portion A2 are separated to implement the dual-flow supply.

As described above, in the dual-flow supply state, outside air not including much moisture is supplied to the window glass side to prevent frost, and high-temperature inside air is supplied to an occupant side to achieve rapid heating.

Figure 3:
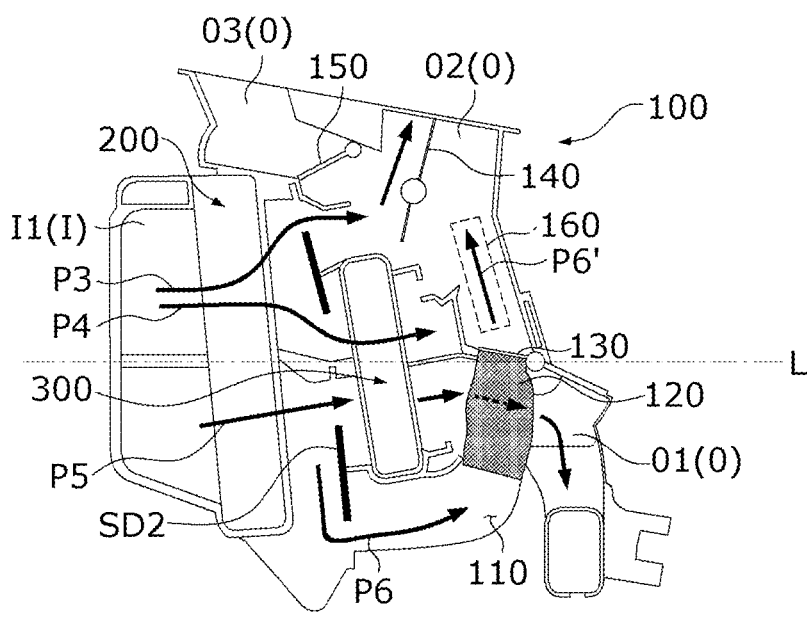
FIG. 3 is a view illustrating a path of air in a second mode which is a bi-mode.
Figure 3:
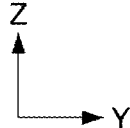

FIG. 3 is a view illustrating a path of air in a second mode which is a bi-mode.

Referring to FIG. 3, in the second mode, which is the bi-mode, the air moves along a third path P3 or a fourth path P4 in the first space portion A1, and the air moves along a fifth path P5 or a sixth path P6 in the second space portion A2.

In the first space portion A1, a portion of the air passing through the cooling heat exchanger 200 is supplied without passing through the heating heat exchanger 300 along the third path P3, and the remaining portions of the air passing through the cooling heat exchanger 200 is supplied after passing through the heating heat exchanger 300 along the fourth path P4.

In the second space portion A2, a portion of the air passing through the cooling heat exchanger 200 passes through the heating heat exchanger 300 along the fifth path P5, and the remaining portions of the air passing through the cooling heat exchanger 200 is supplied along the first flow path 110 without passing through the heating heat exchanger 300 along the sixth path P6.

In the first space portion A1, in the second mode, the second door 140 opens the second outlet O2, and the third door 150 blocks the third outlet O3.

In the second space portion A2, in the second mode, the first door 130 opens a portion of the first outlet O1 and opens the outlet U of the channel part 120.

A portion of the cold air passing through the first flow path 110 is supplied to the second space portion A2 through the channel part 120. The cold air supplied through the channel part 120 functions to reduce the difference between the temperature of the air of the first outlet O1 and the temperature of the air of the second outlet O2 by being supplied to the second space portion A2 without being mixed with the air passing through the heating heat exchanger 300 along the fifth path P5 to decrease the temperature of the air supplied to the second outlet O2.

The air discharged through the channel part 120 may be guided to the second outlet O2 through an air guide 160 disposed in the second space portion A2.

Figure 4:
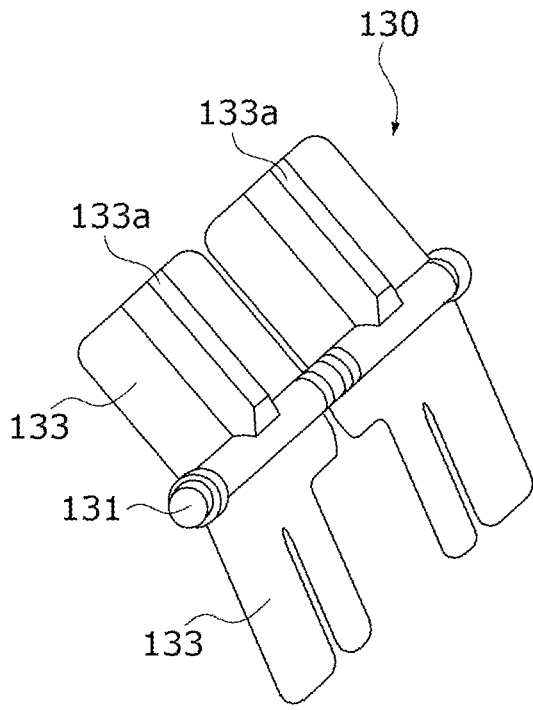
FIG. 4 is a perspective view illustrating a first door.
Figure 5:
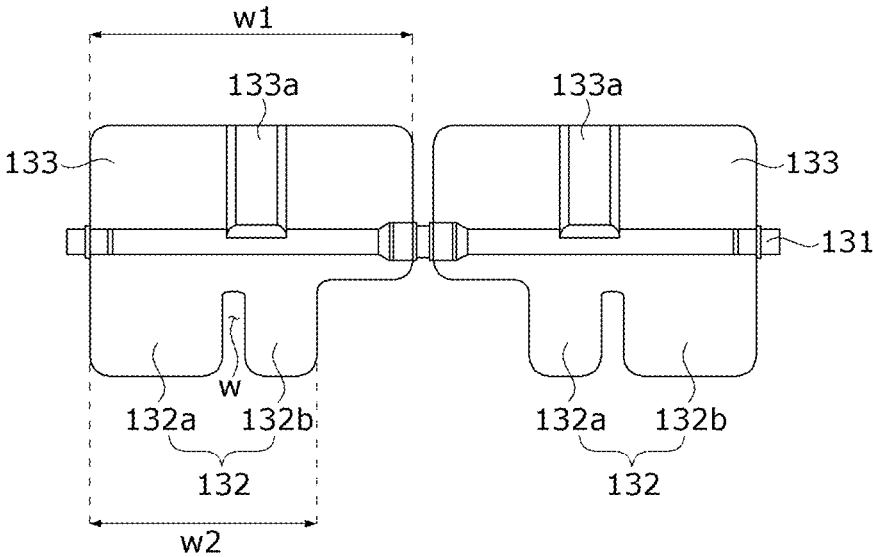
FIG. 5 is a plan view of the first door illustrated in FIG. 4.
Figure 6:
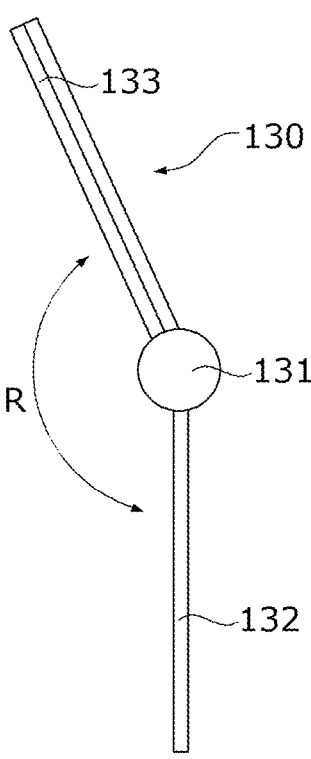
FIG. 6 is a side view of the first door illustrated in FIG. 4.

FIG. 4 is a perspective view illustrating the first door 130, FIG. 5 is a plan view of the first door 130 illustrated in FIG. 4, and FIG. 6 is a side view of the first door 130 illustrated in FIG. 4.

Referring to FIGS. 4 to 6, the first door 130 may include a shaft part 131, a first door plate 132, and a second door plate 133. The first door plate 132 may be disposed at one side of the shaft part 131. The second door plate 133 may be disposed at the other side of the shaft part 131. The first door plate 132 selectively opens and closes the first outlet O1, and the second door plate 133 selectively opens and closes the outlet U of the channel part 120.

The first door plate 132 and the second door plate 133 may be disposed to form an obtuse angle R around the shaft part 131.

The second door plate 133 may include a groove 133*a*. The groove 133*a* is formed to be greater than the channel part 120 so that an end portion of the channel part 120 is accommodated in the groove 133*a* when the second door plate 133 covers the outlet U of the channel part 120. The groove 133*a* may be disposed in the middle of the second door plate 133 with respect to the left-right direction.

A width w1 of the second door plate 133 in the left-right direction is greater than a width w2 of the first door plate 132 in the left-right direction.

The first door plate 132 may include a 1-1 door plate 132*a* and a 1-2 door plate 132*b*, which are spaced apart from each other in the left-right direction with a space w interposed therebetween. Each of the 1-1 door plate 132*a* and the 1-2 door plate 132*b* may open and close a different first outlet O1.

The first door 130 has an advantage of opening and closing the outlet U of the channel part 120 together while opening and closing the first outlet O1.

Figure 7:
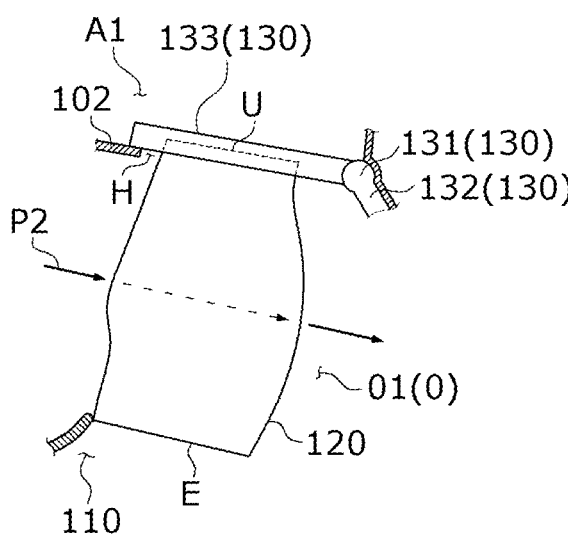
FIG. 7 is a view illustrating a state in which the first door blocks an outlet of a channel part in the first mode.
Figure 8:
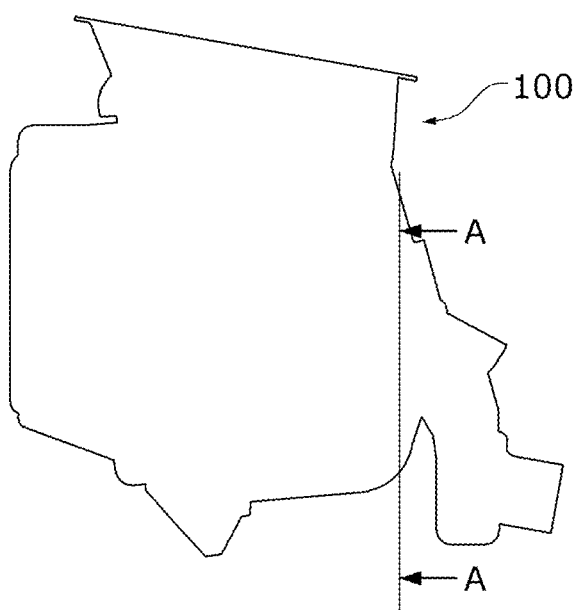
FIG. 8 is a side view of the air-conditioning apparatus for a vehicle according to the embodiment.
Figure 9:
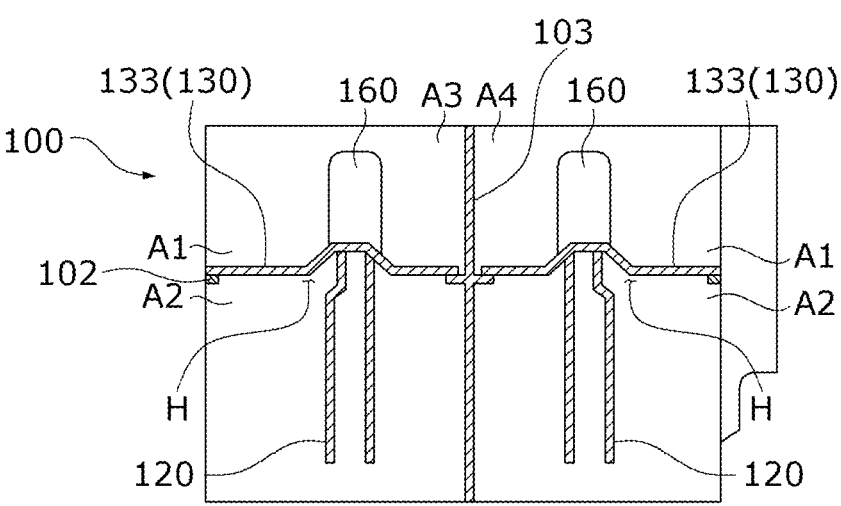
FIG. 9 is a cross-sectional view along line A-A in FIG. 8, which is a cross-sectional view of the first door and the channel part in the state of FIG. 7.
Figure 10:
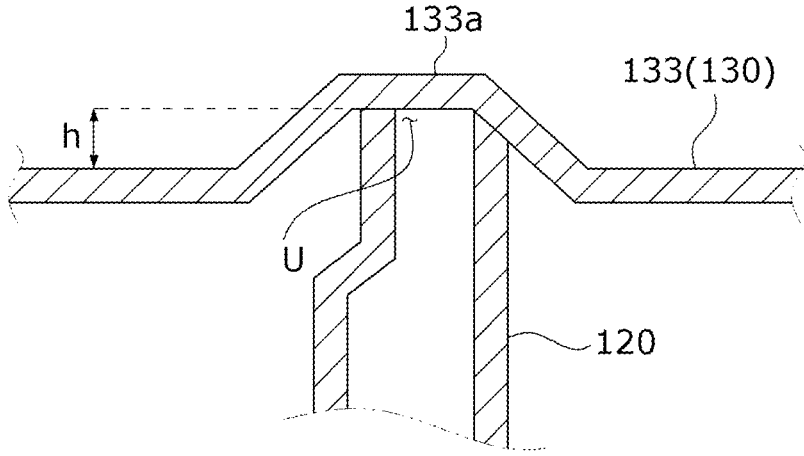
FIG. 10 is an enlarged view of the first door and an upper end of the channel part.

FIG. 7 is a view illustrating a state in which the first door 130 blocks an outlet U of a channel part in the first mode, FIG. 8 is a side view of the air-conditioning apparatus for a vehicle according to the embodiment, FIG. 9 is a cross-sectional view along line A-A in FIG. 8, which is a cross-sectional view of the first door 130 and the channel part 120 in the state of FIG. 7, and FIG. 10 is an enlarged view of the first door 130 and an upper end of the channel part 120.

Referring to FIGS. 7 to 10, the second partition wall 102 may include the hole H. The hole H allows the first space portion A1 and the second space portion A2 to communicate with each other. The outlet U of the channel part 120 is positioned in the first space portion A1 by passing through the hole H. In the first mode, in a state in which the first door plate 132 has fully opened the first outlet O1, the second door plate 133 covers the outlet U of the channel part 120 and the hole H. A size of the second door plate 133 is formed to be greater than a size of the hole H.

The inner space of the air-conditioning case 100 may include a third space portion A3 and a fourth space portion A4 partitioned into left and right sides. The channel part 120 may be disposed in each of the third space portion A3 and the fourth space portion A4. As an example, any one of two channel parts 120 may be disposed in the middle of the third space portion A3 with respect to the left-right direction. The other one of the two channel parts 120 may be disposed in the middle of the fourth space portion A4 with respect to the left-right direction.

The air-conditioning case 100 includes the air guide 160. The air guide 160 is disposed in the first space portion A1 and guides the cold air discharged from the channel part 120 to the second outlet O2. The air guide 160 is disposed to extend in a vertical direction.

The channel part 120 may be disposed to be aligned with the air guide 160 in the front-rear direction. A width of the channel part 120 in the left-right direction may correspond to a width of the air guide 160 in the left-right direction. Therefore, there is an advantage in that the air in the second space portion A2 may be smoothly discharged to the second outlet O2 of the first space portion A1.

When the first door 130 covers the outlet U of the channel part 120, the second door plate 133 except for the groove 133*a* may be disposed to be lower than the outlet U of the channel part 120 is disposed by a predetermined height.

Figure 11:
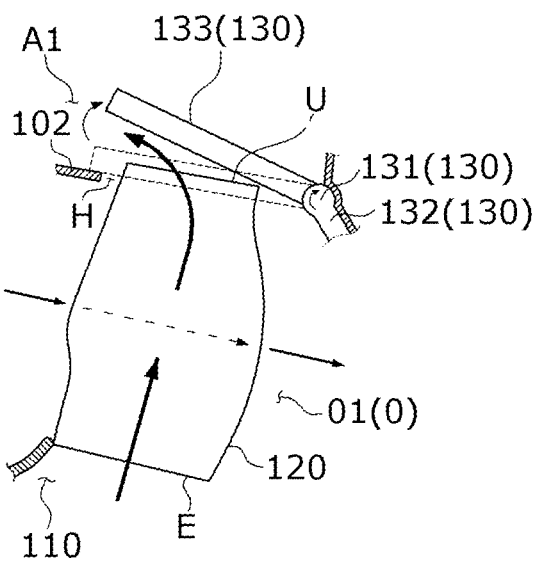
FIG. 11 is a view illustrating a state in which the first door opens the outlet of the channel part in the second mode.
Figure 12:
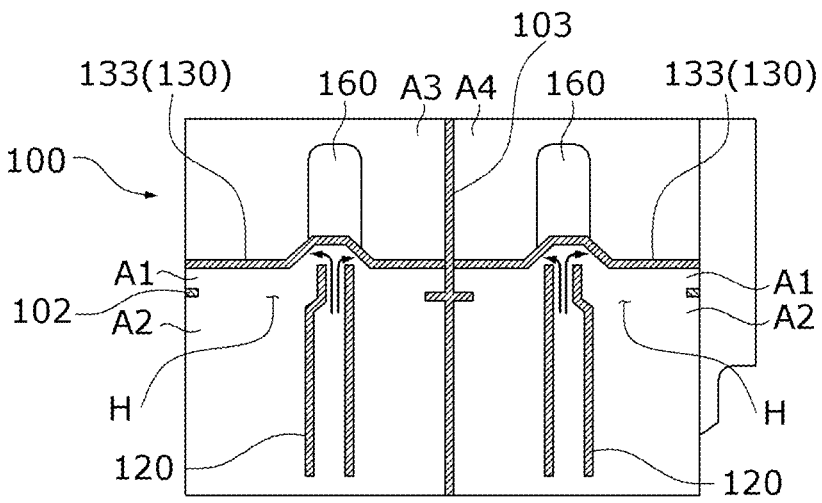
FIG. 12 is a cross-sectional view of the first door and the channel part in the state of FIG. 11.

FIG. 11 is a view illustrating a state in which the first door 130 opens the outlet U of the channel part in the second mode, and FIG. 12 is a cross-sectional view of the first door 130 and the channel part 120 in the state of FIG. 11.

Referring to FIGS. 11 and 12, in the second mode, in a state in which the first door plate 132 has partially opened the first outlet O1, the second door plate 133 opens the outlet U of the channel part 120. When the outlet U of the channel part 120 is opened, the cold air from the first flow path 110 is supplied to the first space portion A1 through the channel part 120. The cold air supplied through the channel part 120 is guided to the second outlet O2 along the air guide 160.

As described above, in the bi-mode, by supplying the cold air in the first space portion A1 to the second space portion A2 through the channel part 120, there is an advantage in that it is possible to reduce the difference between the temperature of the air discharged from the first space portion A1 and the temperature of the air discharged from the second space portion A2.

The air-conditioning apparatus for a vehicle according to one exemplary embodiment of the present invention has been described above in detail with reference to the accompanying drawings.

The above-described one embodiment of the present invention should be understood as illustrative and not restrictive in all respects, and the scope of the present invention will be determined by the claims to be described below rather than the above-described detailed description. In addition, not only the meanings and scopes of the claims but also all changeable or modifiable forms derived from the equivalent concept thereof should be construed as being included in the scope of the present invention.

What is claimed is:

1. An air-conditioning apparatus for a vehicle, comprising:

an air-conditioning case including an inlet, an outlet, and a partition wall configured to partition an inner space into a first space portion and a second space portion;

a cooling heat exchanger disposed inside the air-conditioning case and connected to the inlet to be disposed to cross the first space portion and the second space portion; and a heating heat exchanger disposed inside the air-conditioning case to be disposed to cross the first space portion and the second space portion, wherein the air-conditioning case includes a first flow path disposed in the second space portion and a channel part, the first flow path is disposed under the heating heat exchanger, and the channel part is disposed behind the heating heat exchanger, and an inlet of the channel part communicates with the first flow path and an outlet of the channel part communicates with the first space portion to guide a portion of air passing through the cooling heat exchanger and flowing through the first flow path without passing through the heating heat exchanger to the first space portion through the channel part without being mixed with air passing through the heating heat exchanger.

2. The air-conditioning apparatus of claim 1, wherein the outlet includes a first outlet communicating with the first space portion and a second outlet communicating with the second space portion, the air-conditioning case includes a first door configured to selectively open and close the second outlet, and the first door opens and closes the outlet of the channel part and the first outlet together.

3. The air-conditioning apparatus of claim 2, wherein the first door includes a shaft part rotatably coupled to the air-conditioning case, a first door plate disposed at one side of the shaft part, and a second door plate disposed at the other side of the shaft part, the first door plate selectively opens and closes the first outlet, and the second door plate selectively opens and closes the outlet of the channel part.

4. The air-conditioning apparatus of claim 3, wherein the first door plate and the second door plate are disposed to form an obtuse angle around the shaft part.

5. The air-conditioning apparatus of claim 3, wherein the second door plate includes a groove, and the groove is formed to be greater than the channel part so as to accommodate an end portion of the channel part in the groove when the second door plate covers the outlet of the channel part.

6. The air-conditioning apparatus of claim 3, wherein the second door plate except for a groove is disposed to be lower than the outlet of the channel part when the first door covers the outlet of the channel part.

7. The air-conditioning apparatus of claim 3, wherein, in a first mode in which the first outlet is open, the second door plate closes the outlet of the channel part.

8. The air-conditioning apparatus of claim 3, further comprising a second door configured to open and close the second outlet, wherein, in a second mode in which the second door opens the second outlet and the first door plate opens the first outlet, the second door plate opens the first outlet and supplies some air flowing through the first flow path to the first space portion.

9. The air-conditioning apparatus of claim 1, wherein the air-conditioning case includes a third space portion and a fourth space portion formed by partitioning the inner space into left and right sides, and the channel part is disposed in each of the third space portion and the fourth space portion.

10. The air-conditioning apparatus of claim 2, further comprising an air guide continuing to the second outlet, wherein a width of the channel part in a left-right direction is disposed to correspond to a width of the air guide in the left-right direction.

11. The air-conditioning apparatus of claim 2, further comprising an air guide continuing to the second outlet, wherein positions of the air guide and the channel part are disposed by being aligned in a left-right direction.

12. The air-conditioning apparatus of claim 9, wherein the channel part is disposed in the middle of the third space portion or the middle of the fourth space portion with respect to a left-right direction.

13. The air-conditioning apparatus of claim 3, wherein a width of the second door plate in a left-right direction is greater than a width of the first door plate in the left-right direction.

14. The air-conditioning apparatus of claim 13, wherein the first door plate includes a 1-1 door plate and a 1-2 door plate, which are disposed to be spaced apart from each other in a left-right direction.

15. The air-conditioning apparatus of claim 1, wherein the outlet of the channel part is positioned in the first space portion, and the inlet of the channel part is positioned in the second space portion.

16. The air-conditioning apparatus of claim 3, wherein, in the partition wall, a part of the partition wall disposed behind the heating heat exchanger includes a hole configured to allow the first space portion to communicate with the second space portion, and a size of the second door plate is greater than a size of the hole.

* * * * *